Oct. 29, 1935.  H. CLARE  2,019,212
MACHINE FOR ENCLOSING LETTERS IN ENVELOPES
Filed Oct. 8, 1931  8 Sheets-Sheet 1
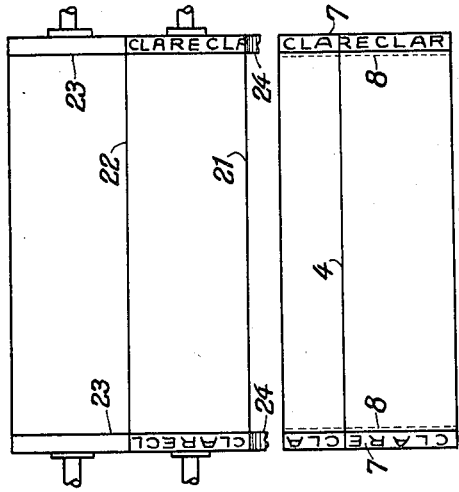
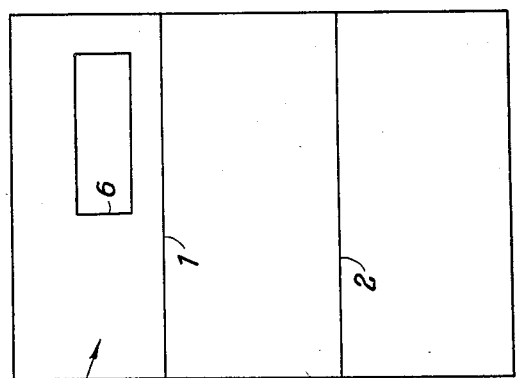
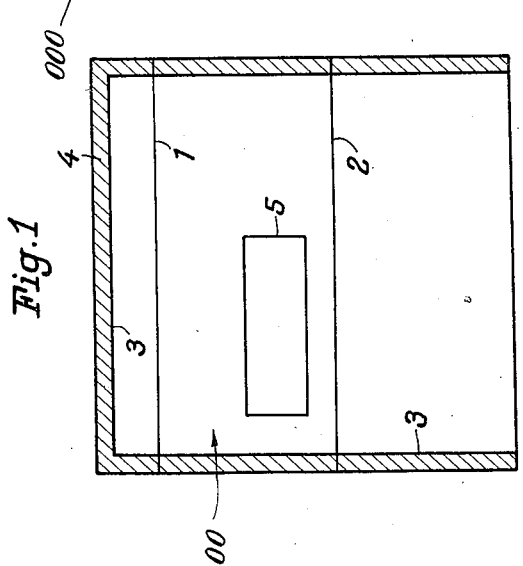
Inventor:
Hermann *Clare*
by *Bernhardt*
Attorney.

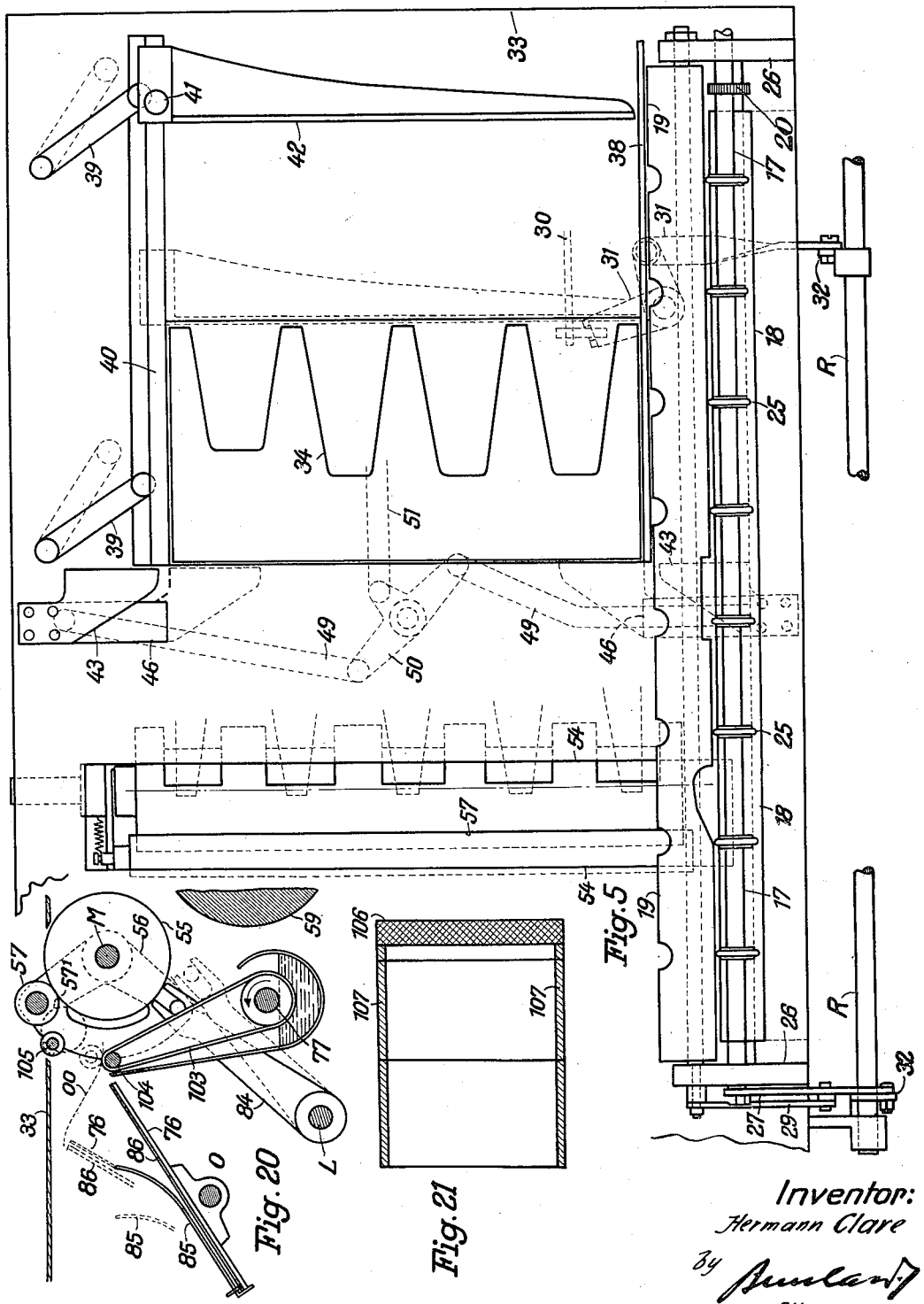

Oct. 29, 1935.        H. CLARE        2,019,212
MACHINE FOR ENCLOSING LETTERS IN ENVELOPES
Filed Oct. 8, 1931        8 Sheets-Sheet 3
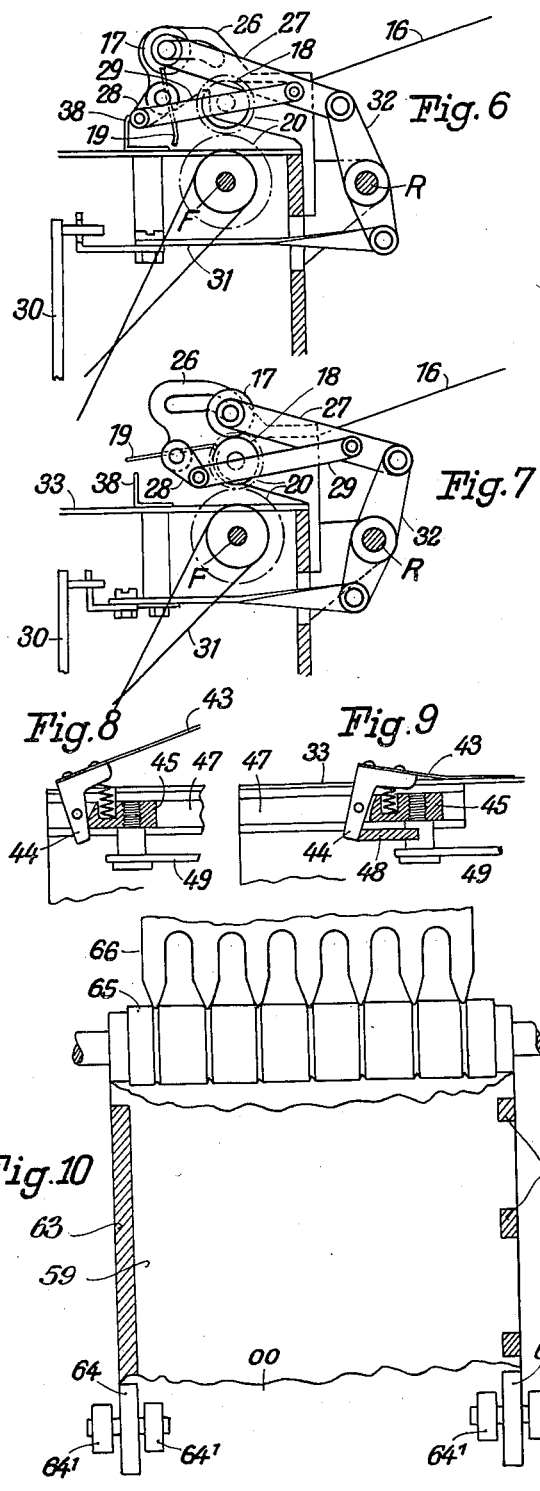
Inventor:
Hermann Clare
Attorney.

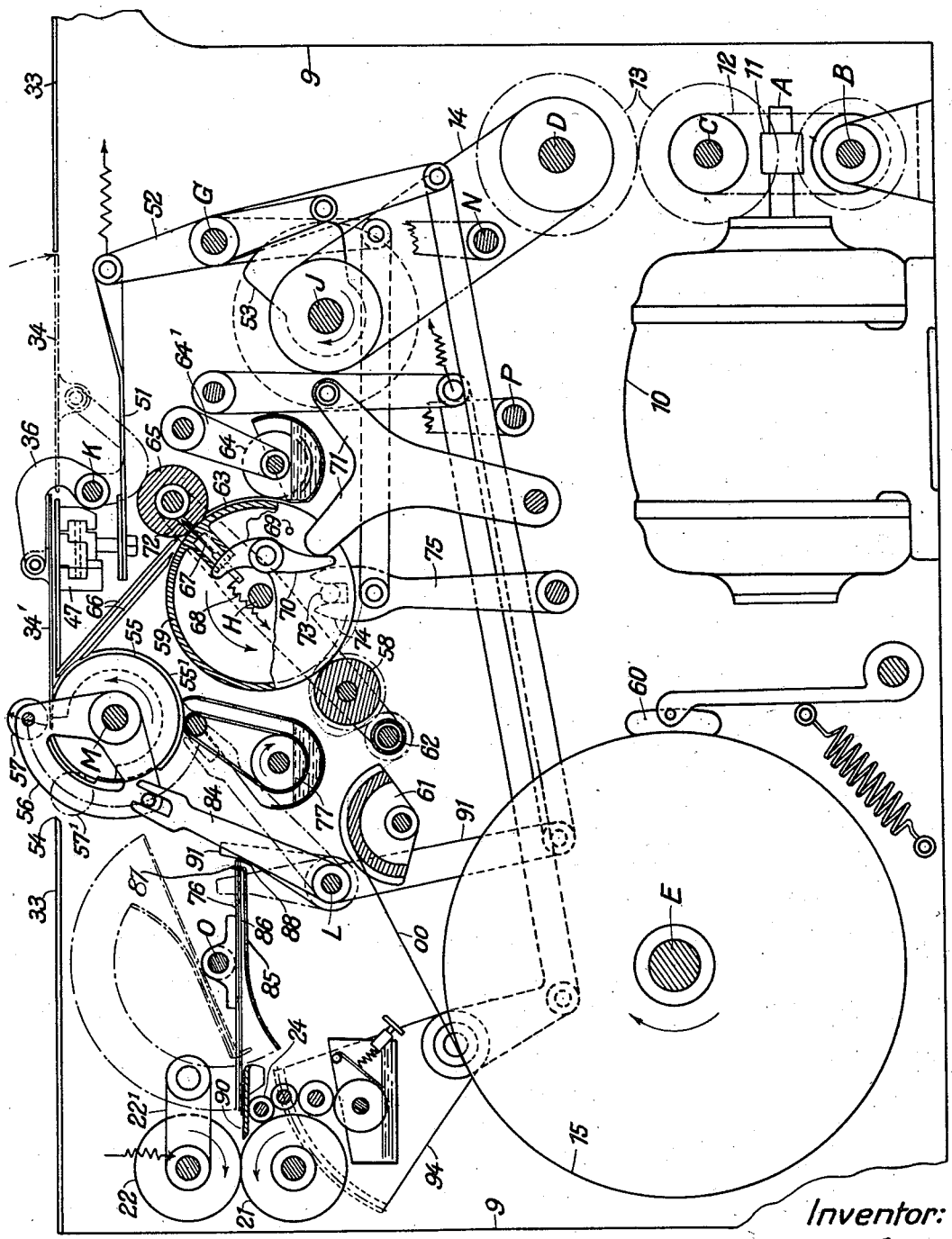

Oct. 29, 1935.  H. CLARE  2,019,212
MACHINE FOR ENCLOSING LETTERS IN ENVELOPES
Filed Oct. 8, 1931   8 Sheets-Sheet 5
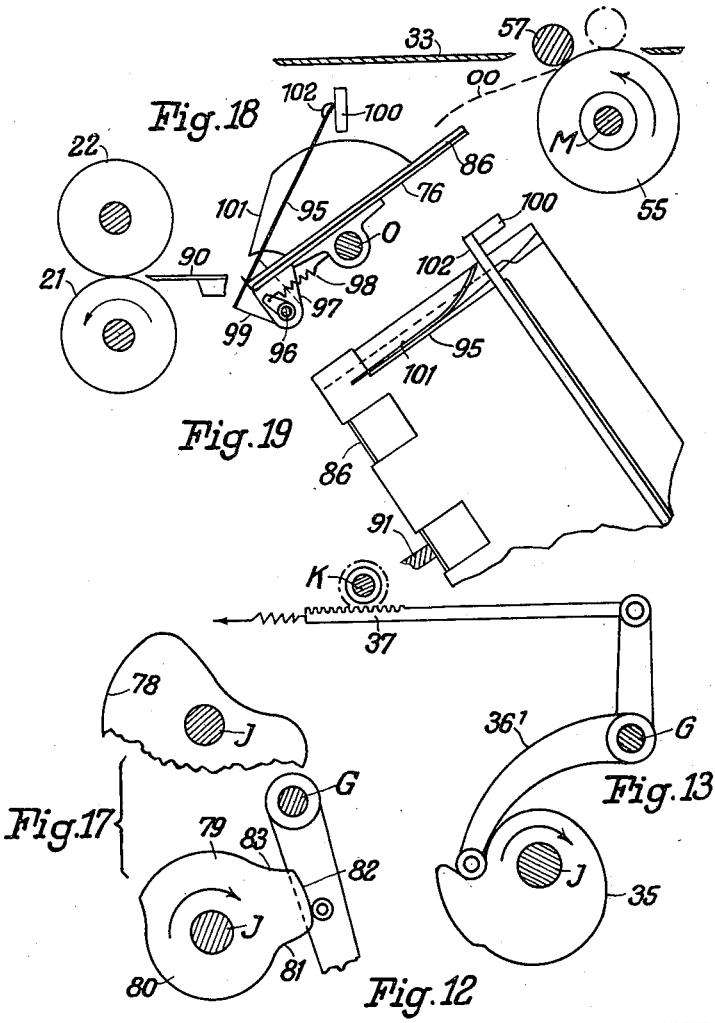
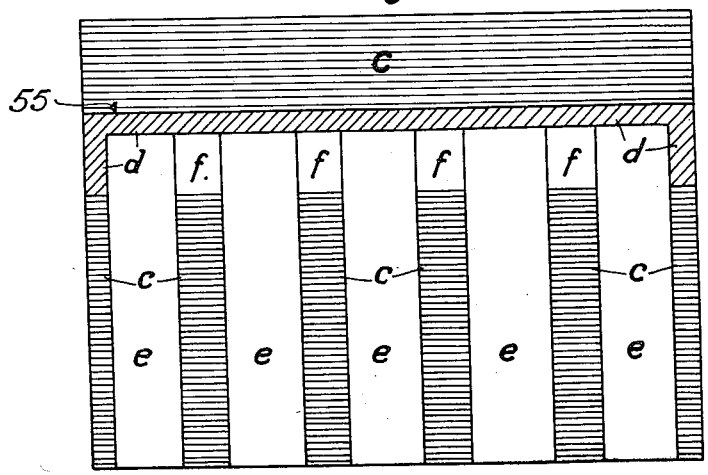
Inventor:
Hermann Clare
by
Attorney.

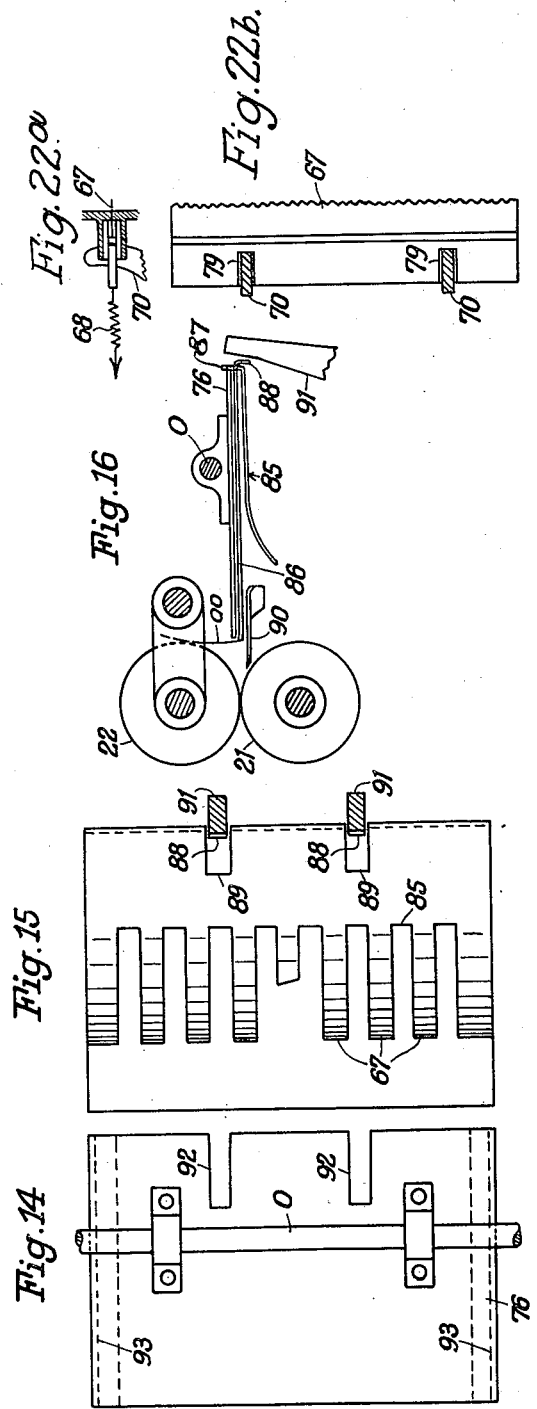

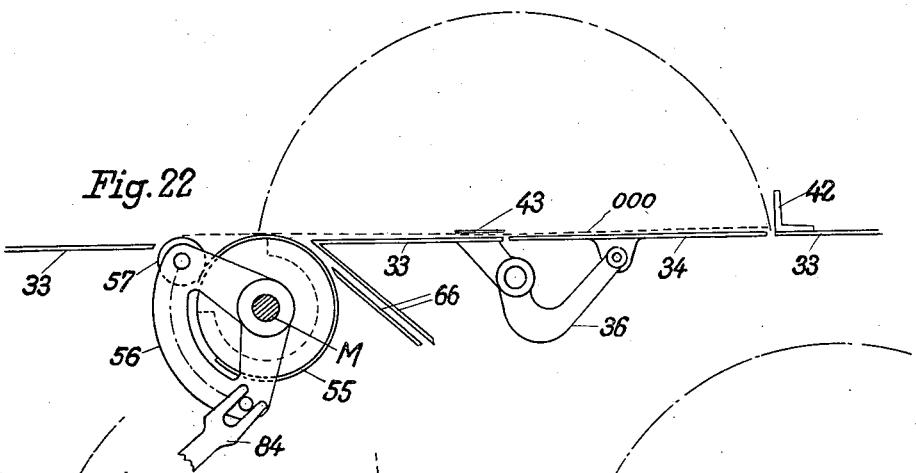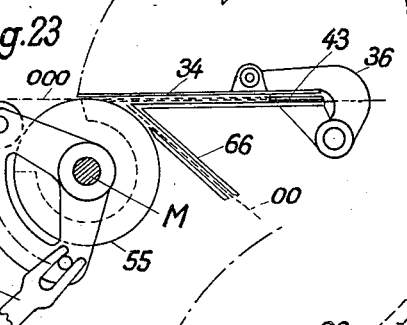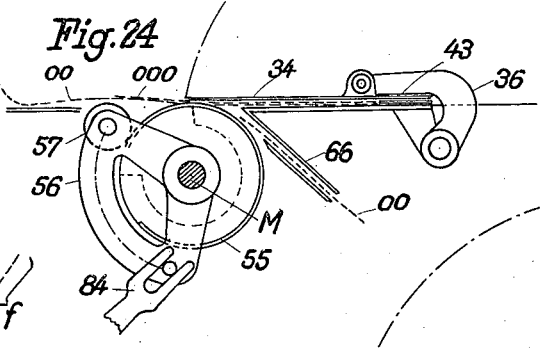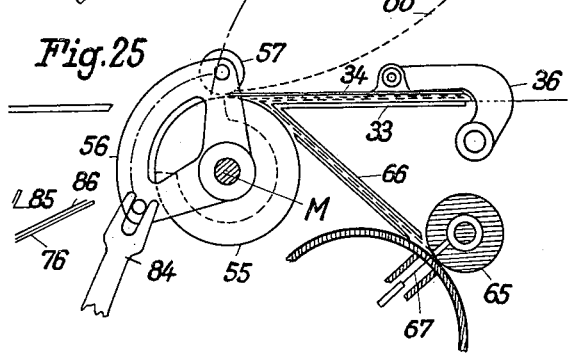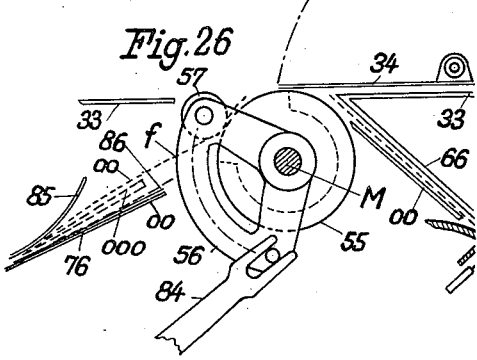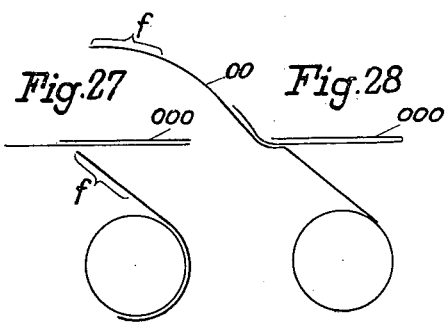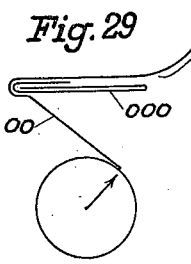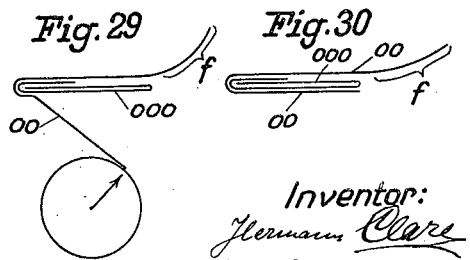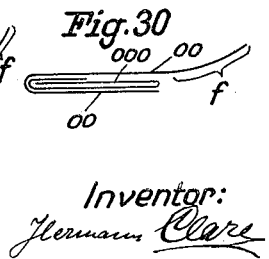

Oct. 29, 1935.  H. CLARE  2,019,212
MACHINE FOR ENCLOSING LETTERS IN ENVELOPES
Filed Oct. 8, 1931   8 Sheets-Sheet 8
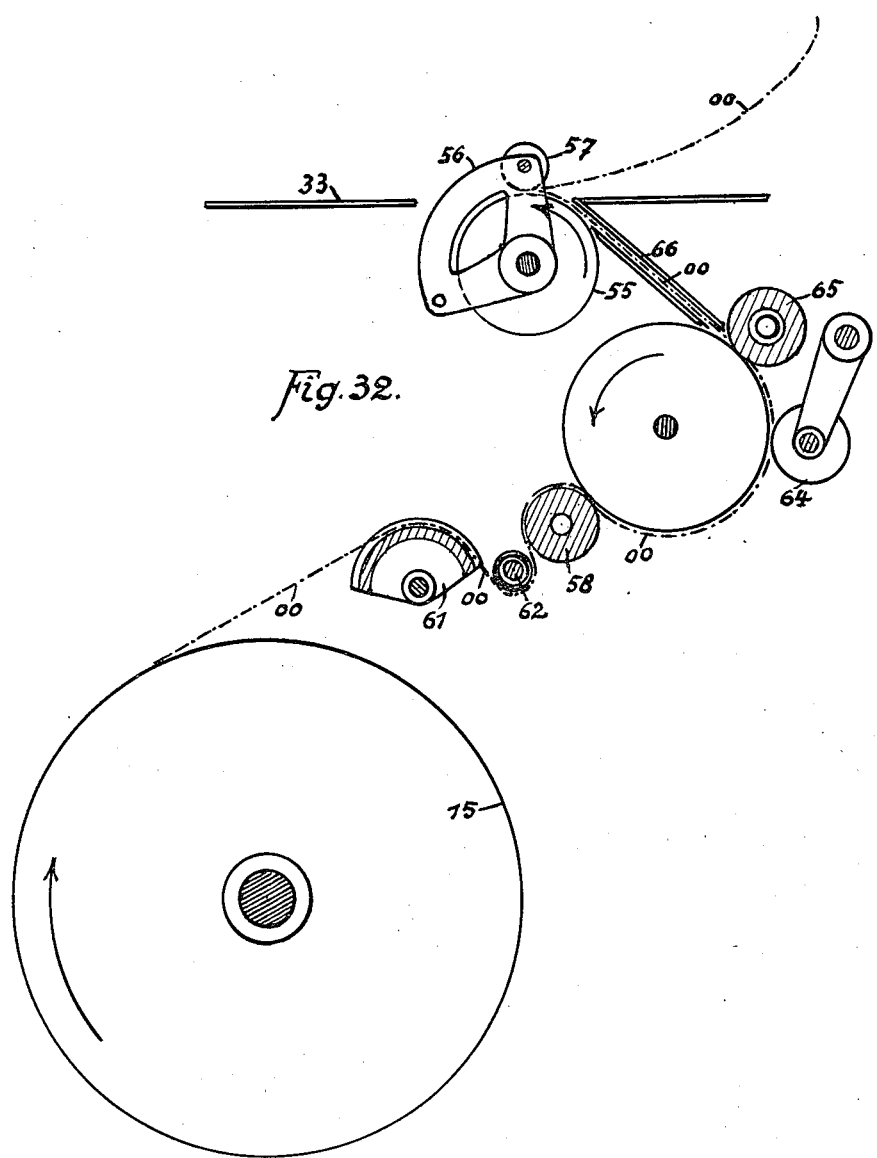

Patented Oct. 29, 1935

2,019,212

UNITED STATES PATENT OFFICE 2,019,212

MACHINE FOR ENCLOSING LETTERS IN ENVELOPES

Hermann Clare, Bern, Switzerland

Application October 8, 1931, Serial No. 567,687
In Switzerland June 27, 1931

4 Claims. (Cl. 93—3)

The subject of the present invention is a machine for enclosing a letter in an envelope secured against unauthorized opening. The nature of the invention resides in devices which again fold the letter together with the envelope after a first folding, gum the letter on the narrow sides and transmit it to a turning device which passes the letter with the folded closing flap into rollers, where the closing flap is fluted and gummed and provided with an impression which obviates unauthorized opening.

For the illustration of the drawings it must be remarked that the machine shown relates to the packing of a definite shape of letter, namely a size of envelope as is used for circulars and prospectuses, 21 cm. x 10½ cm., but which have two side borders of 1 cm. adapted to be torn off, each with half a centimetre lateral spacing for the letter, which latter may be both memo, quarto or foolscap shape.

The machine could, however, also be arranged for any other size of envelope.

In the accompanying drawings are illustrated an example of construction with a few modifications. In the drawings Figures 1 to 17 and Figure 22 relate to the first form of construction, whilst Figures 18, 19 and 20, 21 illustrate two modifications.

In the accompanying drawings:—

Figure 1 shows a view of an extended envelope.

Figure 2 shows a similar view of a letter.

Figure 3 shows a view of the closed letter with two side edges adapted to be torn off and provided with an impression.

Figure 4 shows an elevation of the rollers used for producing the impression and for closing the envelope flap.

Figure 5 shows a plan of the folding table with a portion of the inserting device for the letter.

Figures 6 and 7 show cross sections in two different positions of the inserting members.

Figures 8 and 9 show cross sections in different positions of a folding member.

Figure 10 shows a view of the device for moistening the side edges of the envelope paper e, e.

Figure 11 shows a longitudinal section of the entire machine.

Figure 12 shows a development of a conveying roller.

Figure 13 shows an elevation of the drive for actuating a folding plate provided on a folding table.

Figure 14 shows a plan of a turning member.

Figure 15 shows an underside plan of this member.

Figure 16 shows a longitudinal section of this member.

Figure 17 shows elevations of two cam discs, one for actuating a conveying roller and the other for actuating a folding roller co-operating with this roller.

Figures 18 and 19 show an elevation and plan of a modification of the turning member shown in Figures 14 to 16.

Figure 20 is an elevation of another arrangement for gumming the closing flap of the envelope.

Figure 21 is a view of the spread out envelope with the gum portion shown by hatching.

Fig. 22a is a section showing the moment when a cutter blade is pushed forward by a lever and Fig. 22b shows in a sectional plan how two levers are engaged to move the blade.

The Figures 22 to 30 illustrate diagrammatically the folding of the letter paper and of the envelope paper.

Fig. 22 shows all parts ready for a first folding of the letter.

Fig. 23 shows positions after the first folding.

Fig. 24 the envelope paper taking contact with the letter paper.

Fig. 25 the second folding of the letter paper and simultaneously therewith the first folding of the envelope paper, and Fig. 26 shows the cut off envelope taken along with the folded letter by the folding rollers and fed to a turning plate.

Figs. 27 to 30 show the followed system of folding, to wit:

Fig. 27 the first folding of the letter paper,

Fig. 28 the feeding of the envelope paper with the flap ahead,

Fig. 29 the second folding letter paper and envelope paper together and the cutting of the envelope paper, and Fig. 30 the whole letter ready for the closing of the flap.

Fig. 31 shows a plan and a section of a cutter used for cutting the envelope paper which is unwound from a roll.

Fig. 32 shows the path of the envelope paper from the roller to the folding device.

According to Figure 1 the envelope used according to the present example is provided with two folding lines 1 and 2 and is gummed at the edges 3 indicated by hatching. 4 is the closing flap of the letter and 5 a window for the address provided on the letter.

The letter according to Figure 2 is also provided with two folding lines 1 and 2 and an address 6 printed thereon.

The closed letter according to Figure 3 is provided with two gummed detachable edges 7. These edges are located on both sides at about half a centimetre from the edge 8 of the letter. The impression on the edges executed in colour is adapted to render more difficult unauthorized opening of the letter by softening the gum.

Of the rollers shown in Figure 4 the lower one 21 is the printing roller, whilst the upper one is the counter roller 22 subjected to spring pressure. The latter, by means of the rubber rings 23 provided at its ends, transfers the impression to the edges of the envelope. 24 indicates the inking rollers.

As will be seen from Figure 11, there serves for driving all the movable parts an electric motor 10 mounted on the bottom of the frame 9, from which a shaft B is driven by a worm drive 11, then by a chain drive 12 a shaft C, by toothed wheels 13 a shaft D and, finally, by a chain 14 a main shaft J. On this shaft are keyed all the cam discs which effect the separate movements of the various devices. In addition there is provided at the bottom of the frame on a shaft E a supply roll 15 containing the paper for forming the envelopes. In this machine paper gummed throughout on one side may be used so that for the sealing of the envelopes only the moistening of the required parts would be needed. Or ungummed paper could be used for the envelopes together with a regular gumming device. In this example however for the sake of simplicity paper is used having only the necessary parts gummed which parts will have to be moistened at the suitable moment.

In the example illustrated in Figures 1 to 17 the letters are inserted into a box, either by hand or by means of one of the known inserting devices, of which the bottom 16 inclined towards the inserting device illustrated in Figures 6 and 7 and Figure 5 allows the letters to slide until they meet a locking blade 19 provided between and behind inserting rollers 17 and 18. Of these rollers the lower one is driven constantly by toothed wheels 20 from the shaft F, which is connected by positive driving members to the main shaft J. It is a solid roller, whilst the upper roller 17 is provided with a number of rubber rings 25 tightened thereon (Figure 5). Whilst the front end of the letter bears against the rotating lower roller 18, the front edge of this letter is held up by the upper roller 17 and the locking bar provided with recesses for the rubber rings of the upper roller (see position in Figure 6). The upper roller is movable by means of its pivots in slots of two standards 26. These standards also serve as bearings for the lower roller and the locking blade. By means of an arm 27 (Figures 6 and 7) engaging the end of the shaft of the upper roller 17 and a link 29 connected to this arm 27 and connected to a lever 28 on the pivot of the blade, a lever 32 is swung outwardly by means of a link 30 reciprocated by the shaft J and by means of a lever connection 31, to which lever 32 the arm 27 is connected so as to produce the position shown in Figure 7. In this position the locking blade is almost swung horizontally and the upper roller comes into contact with the lower roller so that the letter is gripped and conveyed to the folding table 33, the bar serving as a lower guide for the letter.

According to Figures 5 and 11 a finger plate 34, adapted to effect a first folding, is held in an opening of the table 33 and on a level with the plane of the table, by means of lugs 34¹ hinged to the bent arms 36. One of these lugs only is shown in Fig. 11. The bent arms 36 are rigidly mounted on a shaft K rotatably mounted under the table plate. This shaft is arranged at right angles to the shafts of the inserting rollers and, as shown in Figure 13, is driven by a cam disc 35, keyed to the main shaft J, by means of a bell crank lever 36' rotatable on the pivot G and rack gearing 37. By means of a sharply projecting cam on the disc 35 there is produced a sudden swinging out of the finger plate and a folding on the table, whilst for the return of the plate a moderated movement takes place, for which purpose a small step initiates this movement and thus produces a tilting of the plate hingedly mounted on the arms, as will be explained in connection with the operation of the machine. A tension spring connected to the rack holds the guide roller of the bell crank lever in constant contact with the cam disc. The finger plate 34 sunk in the opening of the table is arranged inside an adjustable frame comprising a stationary ruler 38 fast to the table 33 and adjacent to the inserting roller 18 and to the border of said opening in the table, a movable ruler 40 guided parallel to ruler 38 by arms 39 according to the size of the letter sheets and a ruler 42 at right angles and adjustable on ruler 40 by means of a set screw 41 to a position adjacent to the border of said opening as is marked with dotted lines. This adjustable frame may be adjusted according to the size of the letter sheets and to the size of the folding to be made. The movement of the bar 40 is also effected from the main shaft J by lever mechanism and a cam disc, not shown.

Close to the edge of the finger plate opening of the plate 33 are provided two holding members 43 in order to firmly hold the letter to be folded by the folding plate during the folding. In Figures 5, 8, and 9 resilient steel blades 43, secured to angle brackets 44, are hinged to slides 45 which are movable in slots 46 and guides 47 provided on the folding table. In the starting position these folding members are held in the raised position outside the limiting bar 19 and the disc bar 40 and when moved forward for holding the letter bear by means of their angle brackets 44 against stops 48 so as thus to be folded downwards on the paper as shown in Figure 9. The slides are connected to links 49 which are connected by a rocker 50 and a link 51 to a lever 52 which receives a swinging movement from a cam disc 53 mounted on the shaft J (Figure 11).

In an opening 54 of the folding table the folding members for a second folding with the envelope paper come into operation. In this second folding there partake, in addition to the finger plate 34, a folding and conveying roller 55 mounted underneath the table on a shaft M, also a folding roller 57 co-operating therewith and mounted in a quadrant frame 56 pivotally mounted on the shaft M. The working of this folding process is fully explained by the Figures 22 to 26. The envelope paper (see Figure 32) is supplied to these folding members from the supply roll 15 by a conveying drum 59, co-operating with a counter roll 58, which is mounted on the shaft H and provided with a cutting device in the hollow space thereof.

The envelope paper, with its gummed side turned toward the center of the supply roll 15, passes, according to Figure 11, from said roll 15, provided with a brake 60, first over a stationary guide saddle 61, provided with side edges, and then around a tension roller 62, between the rollers 58, 59, past a moistening roller 64, periodically held out of contact with the paper, and a pattern 63 provided adjacent the conveying drum and rigidly connected thereto, under a counter roller 65 co-operating with the conveying roller 59. Here the envelope paper passes between two guide plates 66, bearing tangentially against the folding and conveying roller 55 and engaging with a grooved edge (Figure 10) in small grooves on the surface of the roller surface 65 and the drum surface 59 and under the preliminarily folded letter to the folding table 33.

With the exception of the roller 15, which does not have a drive itself, all the other rollers 62, 58, 59, and 64, 65 receive a positive but only stepwise rotation from the main shaft J. The intermeshing gears are shown with mixed lines only for the rollers 62, 58, and 59. The stepwise movement of roller 59 comprises two steps for one revolution of the driving shaft J. These two steps are effected by the cam 78 keyed to said shaft, shown in Fig. 17, and is transmitted by means of an arm pivoted on the shaft G and oscillated by said cam by means of a friction roller kept in contact with the cam's surface. A saw toothed rack hinged to said arm meshes with a ratchet wheel mounted fast on the drum's axis so as to move said drum during its "fro" stroke and running idle during its "to" stroke. Only the cam has been shown separately in the drawings so as to explain the kind of the movement imparted to the drum.

The cutting device consists primarily of a straight cutter blade 67, according to Figure 2, meeting the paper everywhere simultaneously and formed of double cutting wolves' teeth about 5 millimetres high, which is held in a retracted position by a spring 68 from the periphery of the drum in guides arranged somewhat eccentrically relatively to the drum. Two levers 70 pivotally mounted in the interior of the drum are held in engagement with two recesses 79 of this blade and against stops 69 by the spring 68, these levers at the moment of the cutting being actuated by levers 71 arranged outside the drum and operated by a cam disc on the shaft J so that the cutter effects the cutting somewhat after the position in which the rollers 59 and 65 hold the paper, whereby it enters a cutter 72 also arranged somewhat eccentrically on the counter roller 65. The engagement of the levers 71 in the interior of the drum 59, which takes place very rapidly, is rendered possible by suitable slots, not illustrated in the drawings, provided in the periphery of the drum.

At the moment of cutting the rollers 59, 65 are stationary, but in order to accurately fix the position to be assumed by the roller 59 there are provided at both ends of the drum 59 projecting pins 73 with which engage the forked ends 74 of two levers 75 actuated from the main shaft J and thus hold the drum.

In Figure 11 is illustrated the quadrant frame 56 with the small folding roller in its folding position. Its position of rest 57' is indicated in dotted lines, and in this position of rest the envelope paper has already been conveyed such a distance beyond the folding table that now there is only a length of one letter side between the guide plates 66 calculated from the cutting position. Therefore, in the position illustrated the folding roller 57 has already turned the envelope paper, together with the portion of the letter extending beyond the finger plate 34, over the portion of the letter held by the finger plate and the blades 43 and have effected the second folding, see also Fig. 25. The second folding of the letter has thus been completed. In this position also, in which the folding point of the envelope and letter is thus held between the rollers 57 and 55, the actuation of the cutter takes place. The roller 55, together with the folding roller 57 now completes its stepwise forward movement in order to supply the folded letter to the turning plate 76, but only after the folding mechanism and the finger plate have been retracted.

While the letter has been moved into the position shown in Fig. 26 the sealing of the two side edges of the letter will have been effected. This sealing concerns however only that portion of the side edges extended from the lower edge of the envelope blank in Fig. 1 to the line l. The remaining gummed portions of the envelope blank will be moistened later on by the roller 55 and sealed by the rollers 21 and 22.

In Fig. 10 the portion of the gummed side edges which are first moistened on the drum 59 are marked by hatching. The hatching on the left side indicates the gumming needed for regular letters while the partial hatchings on the right side indicate the gumming needed for printed matters.

As may be concluded from the way the paper has been wound on the supply roll 15 the gummed surface of the envelope paper wound around the bottom side of the drum 59 is turned to the outside and facing the moistening rollers 64. There are two such rollers of the width of the gummed strips which are thus moistened and to prevent that the guide plates 66 be not soiled by the strips which have become adhesive the side portions of these guide plates are cut away as shown in Fig. 10. The lower edge of the upper guide plate is indented and engages corresponding grooves of the roller 65 in order to guide this roller sideways because this roller has to receive the knife 67. The drum 59 is also provided with two felt strips 63' corresponding exactly to the strip portions 63 which according to the above have alone to be moistened. These strips 63' press the paper of the envelope against the moistening roller 64 at the proper place and at the proper moment.

As the folding roller 57 catches the envelope paper from underneath it will, while folding the paper, seal first only the part clamped between it and the drum and will seal the rest during its return movement into its position of rest together with the moving drum.

The moistening of the flap edges, as indicated in Fig. 1 by the hatchings, is effected by the roller 55. As shown with dotted lines in Fig. 11 only a quarter of the surface of this roller is solid while the rest is arranged as shown in a development in Fig. 12. Here the portions C are slightly corrugated to insure good gripping. These portions together with the portions $d$ which are covered with felt constitute the surface of the roller, and are only slightly recessed. The portions $e$ are so deeply recessed because they have to leave room enough for the fingers of the finger plate 34. The felt covered portions will get moistened by the moistening band 77 during the rotative movement of roller 55 and will come into exact contact with the gummed edges of the flap during the retreat of the roller 55 from the position of Fig. 25 to that of Fig. 26 and further on are covered with a felt-like material so that the moisture is retained until the parts in question come into operation.

In Figure 17 are shown the cam discs for actuating the small folding roller 57 and the folding and conveying roller 55. The cam disc 78 for this latter roller imparts to this roller for each letter to be enclosed a rotation carried out in steps. The cam disc 79 for the small roller 57, that is to say for the quadrant frame 56 carrying this roller, by means of its periphery of smallest radius 80, leaves the roller 57 in the dotted line position in its position of rest under the table, then with the rise 81 there is effected the folding, with the circumference of largest radius 82, the holding firmly of the folded papers on the ends of the finger plate, with the steep descending portion 83, the inserting of the gummed papers into the turning plate 76 and the moistening of the closing flap of the letter. The actuation of the roller 55 the cam disc 78 is effected by a rack with an idle return stroke. This rack mechanism is needed here because the steps of the roller 55 must remain always exactly the same. A forked lever 84 transmits the movements of the cam disc 79 to the quadrant frame 56.

In the position shown with mixed lines in Fig. 11 at the very moment, when the letter with the still open but moistened flap extended backwards is fed forwards by two rollers 55 and 57. During this anticlockwise movement of said two rollers the letter will be rolled forward from between the rollers and moved tangentially to the roller 55 right into the open mouth formed by the plate 76 and the finger plate 85 and will be inserted into the pocket formed by said plates, the gummed and moistened side of the flap being turned downwards so that roller 57 will not be soiled. Immediately after this the two plates will be turned by the shaft O until the plate 76 will come to rest on the stop plate 90 whereby the flap meeting the roller 22 will be bent into a closing position so as to be closed completely when it is fed between the rollers 22, 23.

The turning movement of the shaft O is effected in a similar way as the movement of shaft K shown in Fig. 13 with the only difference that the cam is shaped somewhat similar to cam 78 in Fig. 17. As this movement is a very simple movement, it has not seemed necessary to show it in particular.

The device according to Figs. 11, 14, 15, and 16 for overturning the letter so as to bring the flap into the reach of the rollers 22, 23 comprises a plate 76 fast to and rotatable with a shaft O, a cover 85 fixed at one end to the plate 76 so as to form a pocket with this plate and provided at its other end with bent up fingers 87 so as to form an open mouth piece with said plate and further comprises a folding blade 86 slidably in lateral guides 93 attached to plate 76. This folding plate is intended to operate the last folding in the machine, to wit: the folding of the envelope. This is done in combination with the rollers 22, 23. The letter fed by the rollers 55, 57 is conveyed into the pocket 85, 76 and rests upon the folding blade 86 (Fig. 26.) When the pocket 85, 76 is overturned the flap dragging behind strikes the roller 22 and is bent back to some extent and this so that the blade 86 which rests now directly upon the open letter on the side of the flap will, when pushed forward by the arms 91 push the edge of the flap together with the letter between the rollers 22, 23 so as to fold the flap sharply and have it sealed by the rollers. The folding plate possesses upwardly bent lugs 88 (Fig. 16) movable in slots 89 of the cover 85 (Fig. 15) and operated upon by levers 91 moved from a cam on the shaft J. In order to permit the movement of these levers also slots 92 have been provided in the plate 76 (Fig. 14). While the letter is fed from the rollers 55, 57 right to the bottom of the pocket 76, 85 lateral guide plates, not shown, ensure the accurate lateral position of the letter relatively to the type rollers. The upper of these rollers can be swung outwardly so that it can be raised according to the thickness of the letter. The actuation of the lower roller is effected periodically by a segment 94 with idle return stroke swung in front of the main shaft J.

The operation when folding and the completely closing of a letter in an envelope is as follows:—

The letter sheet OOO (see Figs. 5, 6, and 7 and 22 to 30) passed into the delivery box consisting only of an inclined bottom 16 and side walls (not shown) slide on this bottom and over the constantly rotating smooth roller 18 until its fore edge meets the locking blade 19 which is now in a vertical position and registers with its recesses with the rubber rings 25 (Fig. 5) of the roller 17. The sheet limiting rulers or marks 38, 40, 42 are adjusted for the maximum size of letter sheet, the finger plate 34 is sunk in the table recess, the folding fingers 43 are retreated laterally and the folding roller 57 in its position of rest under the table 33. The locking blade 19 swings now into an almost horizontal position and at the same time the roller 17 is brought into contact with the lower roller 18. The insert will therefore be conveyed between the limiting marks 38, 40, 42 and will there be held fast at once by the folding members 43 whereupon the finger plate swings upwards and effects the first folding of the letter paper (Fig. 23). In this position a portion of the sheet will still extend beyond the folded portions. After this the envelope paper will be fed forward over the table by the drum 59 and the rollers 58, 62, 15, always with the flap portion ahead. Though the gummed surface of the envelope paper is turned towards the two moistening rollers 64 the flap portions will not be moistened because at the moment when it passes the drum the felt strips 63 will not meet with said portion. This flap portion is during the first folding (see Fig. 23) already between the guides 66 so that only the gummed strips 3 (see Fig. 1) will meet with the said felt strip and get moistened. The forward feed of the envelope paper is continued until a portion of paper amounting to the folded letter portion plus the flap will be extended to the upperside of the table (Fig. 24). In this position the drum 69 stops and the portion of paper extended between the guides 66 to the saw knife 67 mounts to somewhat more than the length of the folded letter paper. Now the cutting of the envelope paper is done while the drum is locked in its positions by the pocked levers 74, 75.

Simultaneously with this stopping of the drum 59 the quadrant frame 56 swings upwardly, engages the envelope paper projecting beyond the table and folds it sharply over the finger points of the plate 34. At the same time the folding tongues and finger plates are drawn back whereby by the small step of the cam disc 35 (Figure 13) the plate 34 carries out a small tilting movement so that its fingers sink into the grooves e (Figure 12) and thus are released from the fold clamped between the rollers 55 and 57. By the rotating roller 55 and the roller 57 mounted in the quadrant lever swinging therewith the folded paper is conveyed under the table whereby the folded end is passed tangentially to the roller 55 into the turning plate 76, now located in its upper position, to the bottom of the pocket formed by the cover 85, whilst the rear end of the envelope paper is withdrawn from the guide 66 and is drawn with the closing flap between the rollers 57, 55 over the moistened parts $d$ of the roller 55 so that after insertion into the turning plate the moistened envelope flap projects rearwardly from the turning plate. During the conveyance of the paper, directly after the second folding, also the narrow sides of the envelope have been gummed in that during the first conveyance of the envelope from the moistening roller 64 guiding the templets 63 the corresponding two narrow sides of the letter, illustrated by hatching in Figure 10, are moistened and are pressed together when passing between the rollers 57 and 55. The letter is then passed into the pocket 85, 76 and the turning plate swings through nearly 180° so that the letter comes to lie between the folding blade 86, lying on the turning plate 76, and the stop plate 90, whereby the closing flap of the envelope, as is indicated in Figure 16 by $o, o$, is bent by bearing against the upper type roller 22. The lever 91 and the toothed segment lever 94 (with idle return movement) are now actuated, the folding blade pushes the letter between the rollers 21, 22, where there is immediately effected the third folding (of the closing flap), the closing flap gummed and the type impression is printed on the edges of the letter, whereupon the completely gummed letter is delivered to the outside. By the upper roller 22 pivotally mounted in the arms 22' but subjected to spring pressure the type rollers adapt themselves to every thickness of letter.

A few modifications are illustrated in Figures 18 and 19 for the moistening of the closing flap and in Figures 20, 21 for the arrangement of the cover of the turning plate 76.

According to Figures 18 and 19 the cover 95 is made rotatable in that its axis of rotation 96 is mounted in lugs 97 secured to the turning plate and the cover is firmly seated on arms 99 subjected to the action of a spring 98. In the position of rest it bears against the turning plate, but in the swung-out position of the plate it comes into contact with stationary stops 100 which open it and render it more suitable for the reception of the inserted letter.

In addition there are also provided lateral guide sheets 101 which bring the inserted letter into the angular direction and laterally into the correct position for printing by the type rollers. As a stop for the cover 95 it is provided with a light crossbar 102.

According to Figures 20, 21 the moistening of the closing flap takes place directly after inserting the letter into the turning plate. In this form of construction the inclined shaded moistening positions $d$ in Figure 12 are omitted and are slightly ribbed in the same manner as the portions $c$. The endless moistening band 103 passes over the rollers 77 and 104. This latter roller projects in front of the position which the end of the turning plate reaches in its uppermost position, and a small counter roller 105 partakes of the rocking of the quadrant frame 56 in such a manner that it comes into contact with the moistening band 103. When the turning plate swings backwardly the closing flap $o, o$ is drawn between the moistening band 103 and the counter roller 105, as shown by broken lines, and thus moistens the surface 106 hatched crosswise in Figure 21, whilst the surfaces 107 with simple hatching, are moistened as before by the moistening roller 64.

Having now particularly described and ascertained the nature of my said invention and in what manner the same is to be performed, I declare that what I claim is:—

1. In a machine for folding letter and envelope paper together to form a closed letter, a folding table on which the sheets are folded and which is provided with an encompassed space, a pivoted folding plate to support and fold part of the letter sheet, a pair of lateral holding members to hold the sheet fast during the first folding operation, means to moisten part of the gummed envelope paper edges, a feed device arranged under the table to feed the partly moistened envelope to the upper surface of the folding table with the flap forming portion ahead, comprising a cutting means to cut off envelope lengths, a pair of folding and conveying rollers to fold the letter a second time and the envelope together and a moistening roller to moisten the open flap and to convey the letter to a turning plate, a turning plate to bring the letter flap ahead of the ejecting rollers, and to prepare the folding of the flap, a pair of ejecting rollers to eject the ready folded letter and to seal it and a folding blade combined with the turning plate and adapted to push the letter between said ejecting rollers.

2. In a machine of the kind described, a folding table to receive the letter and envelope papers from suitable feed devices, said table comprising an encompassed space adjusted according to the maximum size of letter sheet to be packed, a pivotable finger plate sunk in a recessed portion of said encompassed space, a pair of lateral holding members adapted to cooperate with the finger plate to operate the first folding guide plates for the envelope paper obliquely arranged under the table and opening into said recessed portion of the table and a pair of folding and conveying rollers arranged just underneath said opening of the table to seize and fold the letter and envelope paper together.

3. In a machine of the kind described a device for conveying the folded letter from a folding table to the ejecting rollers, said device comprising a pocket shaped turning member consisting of a plate fast to a rotatably mounted shaft, a cover with upturned end fast to said plate and a folding blade slidably guided within said pocket to cooperate in the folding of the flap, a lever and link arrangement to operate said blade and a cam on a driving shaft, to work said link and lever arrangement, a pair of rollers to feed the folded letter into said pocket when in an upturned position and a pair of ejecting rollers to cooperate with said folding blade for folding the moist flap and to seal and eject the letter.

4. In a machine of the kind described and in combination a device for overturning the letter with open flap and for folding the flap, comprising, a pocket-like member to receive the letter, said member formed by a pivotally supported plate and by a parallel cover plate joined thereto by means of a bent up edge, the cover plate having bent up fingers at its opposite edge, a folding plate inside of said pocket-member and accessible through slots provided in the joint of the pocket plates, two swingingly held lever arms engaging said folding plate at said slotted portion of the pocket, a stop plate serving as rest for the overturned pocket, and a pair of ejecting rollers provided at the delivery end of said stop plate, said rollers adapted to close the flap folded by the said folding plate.

HERMANN CLARE.